(No Model.)
F. W. JOHNSTONE.
BLOW-OFF VALVE.
No. 468,878. Patented Feb. 16, 1892.
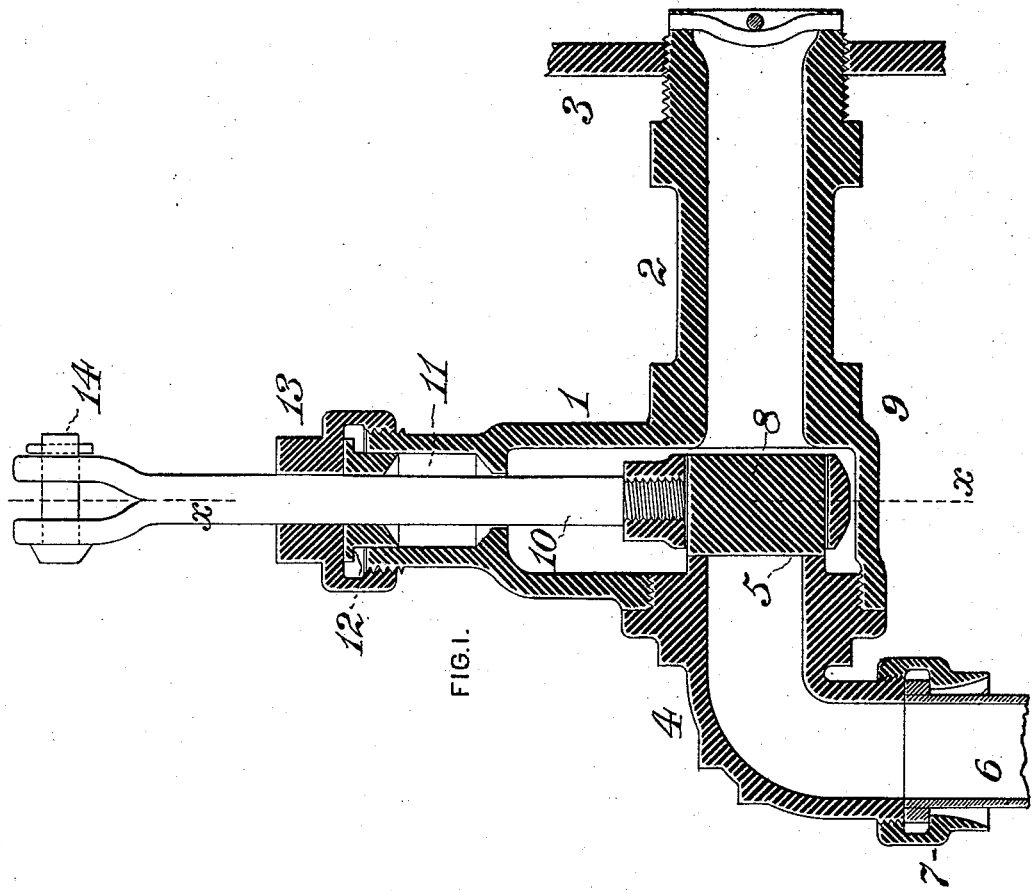
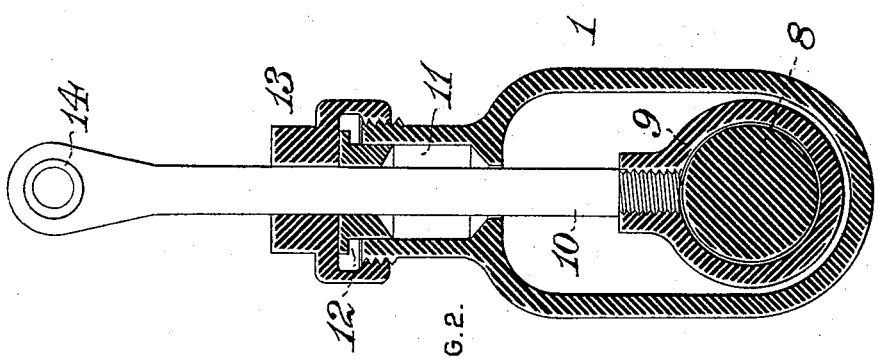
WITNESSES:
INVENTOR,

UNITED STATES PATENT OFFICE.

FRANCIS W. JOHNSTONE, OF MEXICO, MEXICO.

BLOW-OFF VALVE.

SPECIFICATION forming part of Letters Patent No. 468,878, dated February 16, 1892.

Application filed June 25, 1891. Serial No. 397,481. (No model.)

*To all whom it may concern:*

Be it known that I, FRANCIS W. JOHNSTONE, a citizen of the United States, residing at the city of Mexico, in the Republic of Mexico, have invented a certain new and useful Improvement in Blow-Off Valves, of which improvement the following is a specification.

The object of my invention is to provide a blow-off valve of simple and inexpensive construction in the operation of which a perfect joint may be insured without necessitating manual adjustments, and the displacement of foreign matter from the contact-surfaces of the valve and its seat shall be effected in and by the movements of the valve. The improvement claimed is hereinafter fully set forth.

In the accompanying drawings, Figure 1 is a vertical longitudinal central section through a blow-off valve embodying my invention, and Fig. 2 a vertical transverse section through the same at the line $x\ x$ of Fig. 1.

In the practice of my invention I provide a valve body or casing 1, having on one side a tubular projection or inlet-passage 2, which is threaded at and near its outer end for connection to the steam-boiler or other fluid-receptacle 3, on which the device is applied. An internally-threaded opening is formed in the valve-body 1 opposite to and concentric with the inlet-passage, into which opening is screwed an outlet-nozzle 4, having a flat valve-face 5 on its inner end. The outlet-nozzle is, in this instance, in the form of an elbow-casting, to the outer end of which a downwardly-projecting discharge-pipe 6 is connected by a coupling-nut 7. It will be obvious, however, that such specific form, which is adopted for the purpose of admitting of a downward discharge of fluid at any desired distance from the valve, is not essential and that the discharge-nozzle may extend outwardly in line with the inlet-passage or be turned laterally or upwardly, as circumstances may require.

A valve 8, which is of the sliding type and is preferably of cylindrical form and of a diameter slightly greater than that of the bore of the discharge-nozzle, is fitted freely in a yoke or stirrup 9, the valve being adapted to fit truly on the valve-face 5 and the thickness of the valve and its inclosing yoke being slightly less than the distance between the valve-face 5 and the adjacent end of the bore of the inlet-passage, so that the valve and yoke may be moved freely transversely to the common axis of said passage and of the outlet-nozzle, in order to wholly or partially cover or uncover the latter, as may be desired, for the retention or discharge of the fluid contained in the boiler or other vessel to which the inlet-passage is connected. Movement is imparted to the valve and yoke by a rod or stem 10, secured to the latter, said rod passing outwardly through a suitably-packed stuffing-box 11, having a gland 12 and packing-nut 13, and being in this instance provided with a pin 14 at its outer end for the connection of an actuating rod or lever. The valve-stem may, if preferred, be fitted to turn freely in the yoke and be provided with an external screw-thread engaging an internal thread in the valve-body and with a handle or hand-wheel on its outer end, in the manner of an ordinary screw-valve.

In operation the valve is held to its seat by the fluid-pressure in the inlet-passage and communicating receptacle, and being fitted freely in its inclosing yoke is adapted in all positions to adjust itself to a true bearing upon the valve-face 5, parallel to which it moves. It will be observed that the valve and yoke may be moved entirely clear of the valve-face, thus providing a "straight way" or clear opening between the inlet-passage and discharge-nozzle, and the sliding movement of the valve under pressure maintains the surfaces of the valve and its seat on the valve-face in perfect contact, and by the resultant rubbing action displaces any scale or other foreign matter which may tend to be interposed between said surfaces and to impair their close contact and uniform true fit.

I am aware that straight-way valves connected to a yoke and stem and moved thereby to open and close a fluid-passage were known prior to my invention, and such generic construction broadly I disclaim.

I claim as my invention and desire to secure by Letters Patent—

The combination of a valve-body provided with inlet and discharge passages, a flat disk valve subject directly to pressure on the entire area of its back from the inlet-passage and fitting over a seat on the discharge-passage, whereby the valve is held firmly to its seat by the pressure in the inlet-passage, a yoke fitting loosely around the valve, so as to permit the valve to turn freely within it, and an actuating-stem connected to the yoke and guided in the valve-body to impart rectilineal movement to the yoke and to the inclosed valve, substantially as set forth.

FRANCIS W. JOHNSTONE.

Witnesses:
RICHARD GUENTHER,
F. E. TRAINER.